(12) United States Patent
Zhang (10) Patent No.: US 11,121,356 B2
(45) Date of Patent: Sep. 14, 2021

(54) BATTERY ELECTRODE PLATE PREPARATION METHOD

(71) Applicant: NANTONG VOLTA MATERIALS LTD., Jiangsu (CN)

(72) Inventor: Yuhong Zhang, Jiangsu (CN)

(73) Assignee: Nantong Volta Materials Ltd., Jiangsu (CN)

(*) Notice: Subject to any disclaimer, the term of this patent is extended or adjusted under 35 U.S.C. 154(b) by 240 days.

(21) Appl. No.: 16/314,436

(22) PCT Filed: May 5, 2017

(86) PCT No.: PCT/CN2017/083284
§ 371 (c)(1),
(2) Date: Dec. 30, 2018

(87) PCT Pub. No.: WO2018/000938
PCT Pub. Date: Jan. 4, 2018

(65) Prior Publication Data
US 2019/0326583 A1 Oct. 24, 2019

(30) Foreign Application Priority Data
Jun. 30, 2016 (CN) .......................... 201610510525.9

(51) Int. Cl.
*H01M 4/02* (2006.01)
*H01M 4/04* (2006.01)
(Continued)

(52) U.S. Cl.
CPC .......... *H01M 4/0433* (2013.01); *H01G 11/86* (2013.01); *H01M 4/131* (2013.01);
(Continued)

(58) Field of Classification Search
CPC .... H01M 4/0433; H01M 4/131; H01M 4/133; H01M 4/1391; H01M 4/1393;
(Continued)

(56) References Cited

U.S. PATENT DOCUMENTS 7,998,616 B2   8/2011   Buiel et al.

FOREIGN PATENT DOCUMENTS

| CN | 101563741 A | 10/2009 |
| CN | 102629681 A | 8/2012 |

(Continued)

OTHER PUBLICATIONS

International Search Report and Written Opinion dated Jun. 28, 2017 in corresponding International Patent Application No. PCT/CN2017/083284, filed May 5, 2017, 8 pages.

(Continued)

*Primary Examiner* — Jane J Rhee
(74) *Attorney, Agent, or Firm* — Dentons US LLP (57) ABSTRACT

A new type of battery electrode plate preparation method is described. The method can include the following steps: a) a mixing process; b) a milling and polishing process; c) an extrusion shearing and extending process; d) cutting to obtain an electrode membrane; and e) pressing at a high temperature and a high pressure to obtain a battery electrode plate. The method can adopt the active material of different electrochemical batteries as the main body to prepare a thick type battery electrode plate with a high conductivity, a high capacity and a high active material loading, which has a viscoelastic body. The electrode plate can have a flexible organic network structure and an excellent mechanical strength, and can still exist in a variety of electrolytes after hundreds of times or even thousands of times of deep charge and discharge cycles. The thick electrode plate prepared by using the method can be applied to a variety of batteries such (Continued)

as lead-acid battery positive and negative electrode plates, a lead carbon battery electrode plate, a lithium ion battery electrode plate, a supercapacitor electrode plate, a Ni-MH battery electrode plate, and others.

23 Claims, 5 Drawing Sheets

(51) Int. Cl.
      *H01G 11/86*    (2013.01)
      *H01M 4/131*   (2010.01)
      *H01M 4/133*   (2010.01)
      *H01M 4/1391*  (2010.01)
      *H01M 4/1393*  (2010.01)
      *H01M 4/21*    (2006.01)
      *H01M 4/50*    (2010.01)
      *H01M 4/52*    (2010.01)
      *H01M 4/583*   (2010.01)
      *H01M 4/62*    (2006.01)

(52) U.S. Cl.
     CPC ......... *H01M 4/133* (2013.01); *H01M 4/1391* (2013.01); *H01M 4/1393* (2013.01); *H01M 4/21* (2013.01); *H01M 4/50* (2013.01); *H01M 4/52* (2013.01); *H01M 4/583* (2013.01); *H01M 4/623* (2013.01)

(58) Field of Classification Search
     CPC ............ H01M 4/21; H01M 4/50; H01M 4/52; H01M 4/583; H01M 4/623
     See application file for complete search history.

(56) References Cited

FOREIGN PATENT DOCUMENTS

| | | |
|---|---|---|
| CN | 102723211 A | 10/2012 |
| CN | 103151183 A | 6/2013 |
| CN | 101667637 B | 2/2015 |
| JP | 2005-32584 A | 2/2005 |
| KR | 1020060084441 A | 7/2006 |
| WO | 2011/029130 A1 | 3/2011 |

OTHER PUBLICATIONS

Supplementary Extended Search Report issued by the European Patent Office in Application No. 17818935.3, dated Oct. 10, 2019, 7 pages.

Search Report issued by the Japanese Patent Office in Application No. 2018-567664, dated Jan. 21, 2020, 27 pages.

BATTERY ELECTRODE PLATE PREPARATION METHOD

CROSS-REFERENCE TO PRIOR APPLICATIONS

This application is a National Stage of PCT/CN2017/083284, filed May 5, 2017, and designating the United States (published on Jan. 4, 2018, as WO 2018/000938 A1), which claims priority under 35 U.S.C. § 119 to Chinese Patent Application No. 201610510525.9, filed Jun. 30, 2016, each hereby expressly incorporated by reference in its entirety and each assigned to the assignee hereof.

FIELD OF THE INVENTION

The present invention relates to a battery electrode plate preparation method, in particular, a method of preparing a thick electrode plate (>1 mm) with high capacity, high power and long cycle life.

BACKGROUND OF THE INVENTION

As oil resources are being depleted and environmental issues are becoming more alarming, green and environmentally friendly alternative energy source(s) capable of replacing petroleum will be the stars for the industry in the future. Among these, electrochemical energy storage devices, one of the important mediums for storing electrical energy, will play a decisive role. At present, common electrochemical energy storage devices include lead-acid battery, nickel-cadmium battery, nickel-metal hydride battery, lithium-ion battery, and electrochemical supercapacitors. After a comprehensive consideration of aspects, including environmental pollution (for example, high cadmium toxicity in nickel-cadmium battery), cycle life (for example, structural collapse caused by softening of the positive electrode of the lead-acid battery), price cost (for example, high price of rare earth metal), low active material loading (for example, supercapacitor and lithium ion battery electrodes are very thin (~100-300 μm)), reliability and safety (for example, safety hazards arising from using organic solvents as electrolytes), among others, the keys to energy storage device performances are the use of advanced electrode materials and the structure of the electrode plate.

Nowadays, most of the research in the energy field around the world is focused on the replacement of traditional block electrode materials with novel nano-materials that have special structure(s). Advantages of these nano-electrode materials include high specific surface area, pore structure for facilitating electrolyte ion migration, and effective improvements on the electrode material capacity and rate capability. However, the performance excellence of many nano-materials is limited at the laboratory level, at the gram or even milligram scale. Even if successfully industrialized, the high specific surface area, low tap density and need for secondary granulation of the above mentioned nano-materials will bring many technological problems to the current process of preparing battery electrode plate. In particular, controlling the consistency for preparing plates with higher thickness (>1.0 mm) will be difficult. Together, these can lead to serious deviations from industrial production expectations. For batteries, the thickness of inert assemblies such as current collectors, membranes, and packaging materials is essentially fixed. These assemblies occupy considerable portions of the mass and volume of the battery but do not contribute to energy storage capacity. Therefore, in order to improve the mass and volume proportions of the active components in the entire battery, thereby increasing the energy density, technologies involved in the preparation of high performance thick electrodes will be very critical. In addition, most of the industrial disperse homogenization process uses volatile organic solvents that pollute the environment. There is no breakthrough in performance indicators to provide enough profit margins, so that such materials do not have large-scale production prospects. Consequently, the development of a thick plate preparation process that is safe, low-cost, and has active material with high loading properties is of great importance, especially for large-scale energy storage in the future.

Among the many kinds of electrochemical energy storage batteries, lithium-ion battery and supercapacitor, due to their high energy density and high power density, respectively, are currently the representatives of advanced batteries. The preparation processes of organic electrolyte system based electrode for lithium-ion battery and supercapacitor are similar. Both of these preparation processes are as follows: the special solvent and the binder are mixed with the powdery anode and cathode active materials respectively, and the paste of anode and cathode material are formed by uniformly stirred; then, the paste of anode and cathode material are uniformly coated on the surface of the metal foil by an automatic coating machine, and dried by heating and then cut into anode and cathode pieces. Although the capacity of the lithium-ion active material is high, the load per unit volume is low. The thickness of the aluminum foil and the copper foil serving as the current collector is usually 0.016 mm and 0.01 mm, and the thickness of the coating after stirring is generally no more than 300 μm. However, most advanced nano-structure electrode materials cannot be used to prepare thick electrode plate (>1 mm) due to their high specific surface area, low tap density and need for secondary granulation. At the same time, the volatile organic solvents used in the dispersion homogenization process also pollute the environment, the mechanical equipment is also expensive with high depreciation loss, and the recovery technology of lithium battery is still immature with potential safety hazards.

In the energy storage system based on aqueous electrolyte system, lead-acid battery and acid fuel battery suitable for acidic electrolyte systems have particularly important commercial value due to high reliability, low cost, and high energy density compared to alkaline nickel-hydrogen and nickel-chromium battery. Taking the traditional lead-acid battery as an example, the lead-acid electrode plate is the core part of the battery, and its quality directly affects various performance indexes of the battery. At the present time, lead-acid battery electrode plates are mainly produced by pasted plates, and the production process includes the following steps: 1) make test qualified lead powder, dilute sulfuric acid and addictive into lead paste by specialized equipment; 2) fill the lead paste to the grid with a smear machine or by hand; and 3) cure and dry the coated plate to obtain a unformed plate. The entire curing process involves complex chemical reaction, with single or up to four reactions occurring alone or at the same time: I) conversion of metal lead particles to α-PbO while releasing heat; II) growth of basic lead sulfate crystals; III) generation of basic carbonates (i.e. $2PbCO_3Pb(OH)_2$—HC), especially on the surface of electrode active material; and IV) corrosion of the grid metal. These reactions cause hardening of the electrode active material and then form a stable inorganic network that is firmly bonded to the grid. However, the dissection results of a large number of lead-acid batteries show that: on the one hand, the positive electrode plate of the battery will be "mud" after nearly 300 deep charge and discharge cycles, and the internal volume expansion and contraction of the plate caused by charge and discharge will destroy the inorganic network structure and eventually cause battery failure. On the other hand, in order to avoid the sulphation in the condition of incompletely charged, porous carbon materials are used in the battery negative plate to replace all or parts of the traditional lead-acid battery negative electrode material (lead) (CN101563741B, U.S. Pat. No. 7,998, 616B2, CN200910183503, KR1020060084441A). While the hope is to bring a significant increase in power and cycle life of lead-acid battery, however, the introduction of low-density carbon components has brought new challenges to the preparation process of lead-acid battery electrode plates. Therefore, the chemical composition and crystal structure of the lead-acid battery active material strongly depend on the electrode plate preparation process, and these two characteristics of the lead-acid battery active material play an important role in the capacity and mechanical strength of the battery during use.

Generally, the binder material used for the preparation of the electrode is a linear polymer compound, most of which are in high elastic statue at room temperature, which brings great difficulties to the process of electrode paste mixing and membrane forming. Firstly, multiple binders are difficult to disperse uniformly in the paste; and secondly, it is not easy to obtain ideal microstructure and morphology to provide desired performance due to the difficulty of processing. In the traditional rubber industry, in order to meet the requirements of the processing technology, the process of changing the raw rubber from a tough elastic state to a soft and plastic state is called milling. The purpose of milling is to: change the raw rubber from a tough elastic state to a plastic state to increase its plasticity (the essence of increasing plasticity is that the long chain of rubber break into molecular structure with less molecular weight and shorter chain in order to facilitate the mixing and uniform dispersion of the compounding agent during mixing); improve the fluidity of the rubber to facilitate the calendaring operation and stabilize the shape and size of the rubber; increase the adhesiveness of the rubber to facilitate the molding operation; and improve the solubility of the rubber in the solvent to facilitate the preparation of the rubber paste, and reduce the viscosity of the rubber paste to make it easy to penetrate deep into the fiber pores and increase adhesion. Therefore, if the same milling process is introduced into the preparation process of electrode, the binder is turned into a highly plastic state and dispersed uniformly in paste, thus the adhesion is increased and the structure stability and electrochemical performance of the electrode will be greatly improved.

The present invention provides a new type of battery electrode preparation method for preparing a thick electrode plate (>1 mm) with high capacity, high power and long cycle life, and the application of this method to various electrochemical energy storage devices such as lead-acid battery, supercapacitor, lithium-ion battery and nickel-hydrogen battery.

SUMMARY OF THE INVENTION

The purpose of the present invention is to design a process for the preparation of a controllable thick type battery electrode plate applicable to the active material of a variety of electrochemical batteries. This battery electrode plate has high conductivity, capacity and active material loading, and has a viscoelastic body. This electrode plate also has a flexible organic network structure and an excellent mechanical strength, such that the electrode plate can still exist stably in a variety of electrolytes even after hundreds or even thousands of times of deep charge and discharge cycles. Also described are a various thick electrode plates prepared using the process, wherein the thick electrode plate is suitable for use in various batteries. Examples of these thick electrode plates include lead-acid battery positive and negative electrode plates, a lead carbon battery electrode plate, a lithium ion battery electrode plate, a supercapacitor electrode plate, a Ni-MH battery electrode plate, among others. The present invention also describes an electrode plate prepared from a special tungsten oxide ($WO_3$) material. Based on this plate, the mixture of this tungsten oxide material and the lead acid anode material can also be realized through this new preparation technology. This plate-preparation technology, whether applied in the positive and/or the negative electrode of the battery described above, has excellent energy, power and cycle stability properties.

The invention specifically provides a new method for the preparation of battery electrode plate(s), comprising the following steps:

a) a mixing step comprising of mixing an electrode active materials and a conductive agent with a prescribed polymer, and stirring evenly the mixture of electrode active materials, the conductive agent and the polymer into a paste;

b) milling and polishing the paste formed in the step a) to fibrillate the polymer in the paste, c) extruding, shearing and extending the paste obtained in the step b) to turn it into an uniformly compact active membrane that has controllable thickness;

d) cutting the active membrane obtained in the step c) into the desired size according to an electroplate design to obtain different size pieces of electrode membranes; and e) inserting a current collector between two pieces of electrode membranes, and then pressing the two pieces of electrode membranes and the current collector into a plate under high temperature and high pressure;

Preferably, said polymer is selected from one or more of polytetrafluoroethylene (PTFE), polyvinylidene difluoride (PVDF), fluorinated ethylene propylene (FEP), fluororubber, trifluoro(heptafluoro-1-propoxy)ethylene and Polyfluoroalkoxy (PFA).

Preferably, said polymer is in the form of an emulsion, and has a solid content of from 50% to 60%, a melt index of from 3 to 10, a melting point of from 120° C. to 320° C., and a polymer particle size of from 5 to 100 μm.

More preferably, the particle size of said polymer is from 5 to 50 μm.

Preferably, the content of said polymer in the battery electrode plate is from 1 to 20 wt %.

More preferably, the content of said polymer in the battery electrode plate is from 3 to 10 wt %.

Preferably, said electrode active materials is selected from any of the positive or negative materials suitable for lead acid battery, lead acid super battery, lead tungsten proton capacitor, graphene battery, lithium ion battery, supercapacitor, and/or NiMH battery.

More preferably, said electrode active materials comprises lead oxide, lead, lithium cobaltate, lithium manganate, ternary or multi-element oxide, lithium iron phosphate, lithium titanate, graphite, graphene, activated carbon, carbon black, nickel oxide, nickel hydroxide, metal hydrogen storage alloy, tungsten oxide, molybdenum oxide, vanadium oxide and/or manganese oxide.

Preferably, said mixing process includes the steps of: adding the prescribed amount of said electrode active materials into a mixer; dry mixing the electrode active materials at a dispersion speed of from 300 to 1000 rpm and a revolution speed of from 20 to 200 rpm; spraying said polymer to the mixed content in the mixer, wherein said polymer is from 3 to 20 wt % of the paste; stirring the polymer and the electrode active materials for from 10 to 30 minutes; and extruding the paste, wherein the solid content of the paste is from 60 to 85 wt %.

In another embodiment, said dispersion speed is from 300 to 600 rpm, said revolution speed is from 20 to 60 rpm, and said polymer is from 3 to 10 wt % of the paste.

In another embodiment, the number of times of the milling and polishing in step b) is less than 10, and the speed is from 1 to 18 m/s.

Preferably, said number of times of the milling and polishing in step b) is less than 8, and the speed is from 1 to 10 m/s.

In another embodiment, the thickness of said active material membrane in step c) is from 1 to 5 mm, and the solid content of the membrane is from 70% to 90%.

Preferably, the thickness of said active material membrane is from 1 to 3 mm.

In another embodiment, said battery electrode plate preparation method further comprises drying the cut electrode membrane obtained in step d), wherein the solid content of the dried electrode membrane is from 80% to 95% and the drying temperature is from 50 to 200° C.

Preferably, said drying temperature is from 50 to 100° C.

In another embodiment, said current collector in step e) is a conductive materials.

Preferably, said current collector is selected from one or more lead grid, titanium mesh, copper mesh, aluminum mesh, stainless steel mesh, carbon felt and/or carbon cloth.

Wherein the step e) specifically comprises: pre-pressing the two pieces of electrode membrane and the current collector with a press machine, wherein the pre-pressing pressure is from 30 to 60 MPa per unit area of membrane, and the pre-pressing dwell time is from 5 s to 180 s; heating the pre-pressed plate in a tunnel kiln for heating; and heating the pre-pressed plate to a temperature of from 140 to 320° C. and pressing the heated pre-pressed plate using a pressing pressure of from 70 to 120 MPa per unit area of the membrane and a dwell time of from 10 s to 600 s to form the plate.

Preferably, said pre-pressing pressure is from 40 to 50 MPa per unit area of membrane, the heating temperature of the pre-pressed plate is from 140 to 320° C., and the final pressing pressure is from 90 to 100 MPa per unit area of the membrane.

Another aspect of the present invention is to provide an energy storage battery, wherein, the energy storage battery comprises an electrolyte and an electrode comprising of the battery electrode plate prepared by method described herein.

Wherein, the energy storage battery includes but is not limited to: lead-acid battery, super battery based on lead-acid systems, lithium-ion battery, supercapacitors, and Ni-MH battery; and wherein, the electrolyte is selected from one or more of sulfuric acid, potassium hydroxide, sodium sulfate solution, and lithium ion battery organic electrolyte or ionic liquid, among others.

The advantages of the present invention are:
1) The synthesis process of the electrode plate is simple, and the industrial devices have been widely used in the synthesis of a large number of chemical products, so that the electrode plate is easy to mass-produce.
2) The electrode plate obtained has a high consistency and has a stable flexible network structure with high viscoelasticity, which is conducive to the contact between the active material and the conductive agent to form a good interface, and the structure does not change during the working process, thereby suppressing the stress generated by the volume change of the positive and negative electrodes, providing a stable conductive network and improving cycle life.
3) The electrode plate obtained has a high viscoelasticity and the morphology characteristic of the fiber structure network helps the rapid transmission of ions. The electrode plate obtained also possesses high conductivity, which can effectively reduce the internal resistance of the electrodes (positive and negative electrodes), thereby realizing high capacitance, high charge and discharge rate and large current charge and discharge property.
4) The electrode plate obtained is suitable for the positive and negative electrodes of a lead-acid battery. The electrode plate obtained not only effectively improves the utilization rate of the active material in the lead-acid battery, but also improves the energy density of the battery. Adopting a high temperature and a high pressure at the same time is beneficial to the curing process of the electrode plate. With respect to the lead acid battery positive electrode, the softening is prevented. With respect to the lead acid battery negative electrode, other conductive materials that can prevent the negative electrode from sulfation can be introduced.
5) The electrode plate obtained is suitable for the lead tungsten proton capacitors' negative electrode. Adopting the new plate preparation process described herein is completely different from traditional lead acid negative electrode coating method and greatly improves the mechanical strength, conductivity, charge and discharge acceptance capability and cycle life of the negative electrode plate.
6) The electrode plate obtained is suitable for the positive and negative electrodes of a graphene battery.
7) The electrode plate obtained is suitable for the positive and negative electrodes of a lithium ion battery.
8) The electrode plate obtained is suitable for the positive and negative electrodes of a super capacitor.
9) The electrode plate obtained is suitable for the positive and negative electrodes of a NiMH battery.
10) The excellent high and low temperature performance effectively improve the conductivity and porosity of the active material, which improves electrolyte diffusion; high temperature induced grid corrosion and positive electrode softening are also alleviated by the improvement in conductivity and porosity, thereby extending the battery life under various extreme conditions.
11) The new battery electrode plate system obtained, through its structural design, are low cost, high energy density, high rate performance, long life and safe.

DRAWINGS

FIG. 6a-c. Photographs of interfaces between the grid and the membrane using three Formulas of the plates which are pressed at high temperature, high pressure and room temperature respectively.

FIG. 6d. Photograph of the interface between the grid and the membrane of the plate pressed at room temperature.

DETAILED DESCRIPTION OF THE INVENTION

The advantages of the present invention are further illustrated by the following embodiment, but the scope of the present invention is not limited by the following embodiment. The reagents and raw materials used in the present invention are commercially available.

Embodiment 1: Preparation of the Lead-Tungsten Proton Capacitor Negative Electrode Plate 1) Formula and Raw Materials:

The raw material of the lead tungsten proton capacitor negative electrode was tungsten trioxide. The preparation method of tungsten trioxide was to use sodium tungstate as the tungsten precursor material. The sodium tungstate was dissolved in deionized water to form a uniform solution with a concentration of 5%. Then appropriate amount of hydrochloric acid was added to make the pH value of the solution 1.5. Subsequently, 5% ammonium sulfate was added to the solution to form an intermediate. The mixed solution was transferred to a reaction vessel and reacted at 160° C. for 72 hours to finally obtain a tungsten trioxide material.

Other raw materials and their weight percentages are shown in Table 1: among them, acetylene black, PTFE and EFP emulsions are commercially available. PVDF solution was prepared by dissolving 200 g of PVDF powder in 1.8 kg of N-Methyl pyrrolidone (NMP) solution and stirring the solution to make a solid content of 10 wt % solution.

TABLE 1

Formula of lead-tungsten proton capacitor negative plate and mass percentage of each component

| composition | Weight percentage | | |
|---|---|---|---|
| | Formula 1 | Formula 2 | Formula 3 |
| Tungsten trioxide | 88% | 86% | 86% |
| Acetylene black | 7% | 7% | 7% |
| PTFE (solid content of emulsion: 60%) | 5% | 5% | 5% |
| EFP (solid content of emulsion: 50%) | / | 2% | / |
| PVDF (solid content of solution: 10%) | / | / | 2% |

2) Method and Steps

Figure 1:
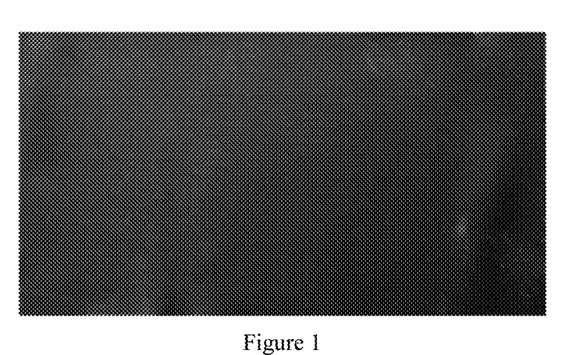
FIG. 1. Photograph of the membrane of a lead-tungsten proton capacitor negative electrode paste formed after the milling process.
Figure 2:
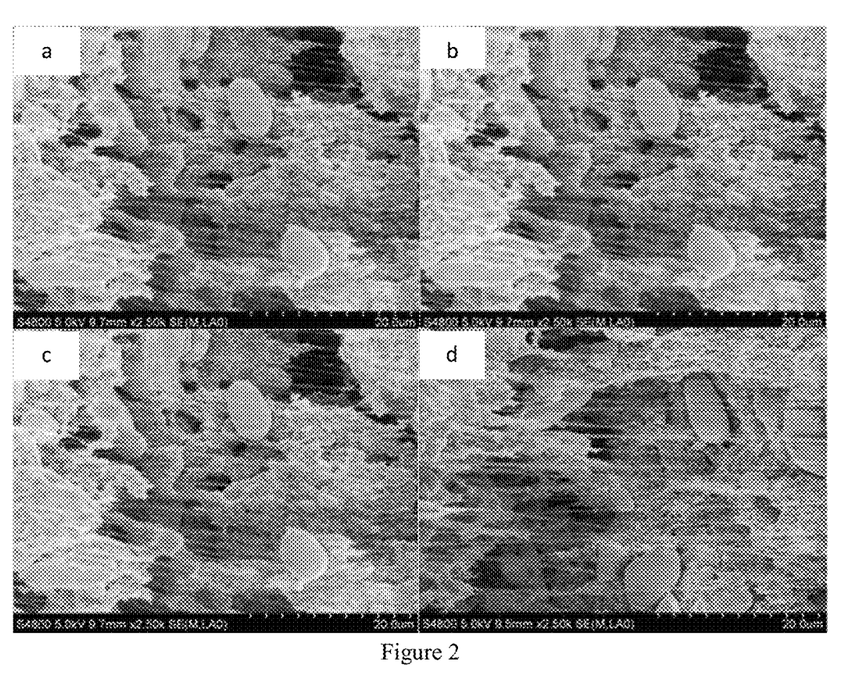
FIG. 2a. SEM image of the negative electrode membrane of a lead-tungsten proton capacitor after 8 times of milling.
FIG. 2b. SEM image of the negative electrode membrane of a lead-tungsten proton capacitor after 10 times of milling.
FIG. 2c. SEM image of the negative electrode membrane of a lead-tungsten proton capacitor after 12 times of milling.
FIG. 2d. SEM image of the negative electrode membrane of a lead-tungsten proton capacitor after 14 times of milling.

The materials mentioned above were added in proportion and dry mixed in a dual planetary mixer. The mixing speed was divided into dispersion speed and revolution speed (dispersion speed and revolution speed here was 300 rpm and 20 rpm respectively). After mixing, a mixture of colloidal emulsion or solution was sprayed in. After stirring the whole mixture for 15 minutes, the solid content of the paste was from 80% to 85%. Then the paste was milled and polished for 6 times. The speed of the milling was 6 m/s. After milling, the membrane was pressed into a dense and uniform membrane by a two-bar calendar. The thickness of the resulting membrane was 1-2 mm and the solid content of the membrane was from 81% to 86%. A photograph of the formed membrane is shown in FIG. 1. It can be seen that the whole membrane is uniform and dense, and the thickness deviation of the membrane does not exceed 0.03 mm. FIG. 2 shows the SEM image of the internal structure of the membrane. It can be clearly seen that, as the times of milling increases, the entire colloid is sheared into a fiber network to encapsulate the active material, but the diffusion of the electrolyte between the electrode active materials is not affected. As the number of milling increases to 14 times, the high-strength shear force will break the fibers and the uniformity of the surface of the membrane is destroyed. See FIG. 3a for the presence of large holes. This result indicates that the times of milling will directly affect the uniformity of the membrane.

Figure 3:
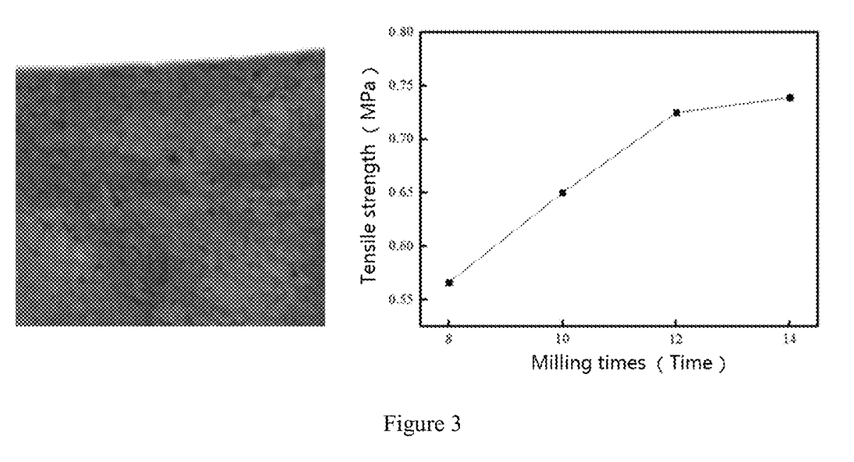
FIG. 3. Tensile strength relationship of lead-tungsten proton capacitors under different milling times and then membrane photo after 14 times milling.

In order to further verify the relationship between the mechanical strength of the membrane and the number of times of the milling, the membrane was cut into a size of 100 mm*1.5 mm, and then tested by a tensile strength tester (model QJ210A). Two ends of membrane was fixed to the upper and lower chunk of the tester, the running speed was set to 50 mm/min, and the test was started by pressing the start button. The data results are shown in FIG. 3b. As the number of times of the milling increases, the tensile strength of the membrane also increases. After 12 times of milling, the membrane strength increases slowly. Accordingly, the optimum number of times of milling is from 8 to 12.

Figure 4:
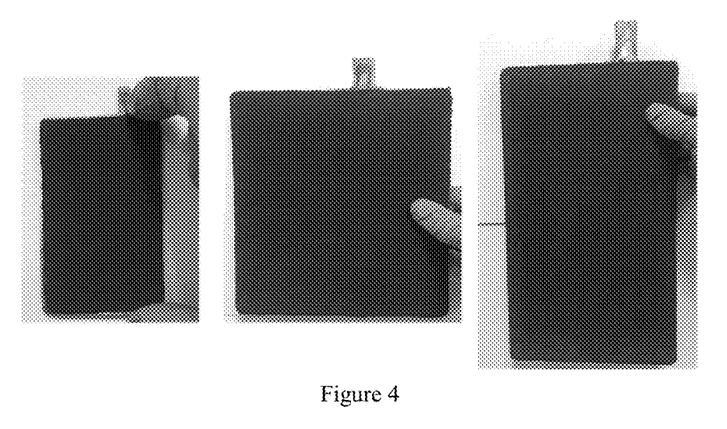
FIG. 4. Photographs of different specifications of negative electrode plates of lead-tungsten proton capacitors.

The preferred choice of the milled membrane was cut into a membrane the same size as the current collector grid. The membrane was then baked in an electric oven so that the solid content of the membrane is from 85 to 100%. The heating temperature range was from 100 to 180° C. The baked membrane and the grid were then stacked in the grinding tool, heated to from 140 to 320° C. by a muffle furnace, then pressed for 5 minutes under 30 t by a flat vulcanizing machine. The table temperature of the flat vulcanizing machine was from 250 to 300° C. FIG. 4 shows photographs of the different sizes of the electrode plates.

Figure 5:
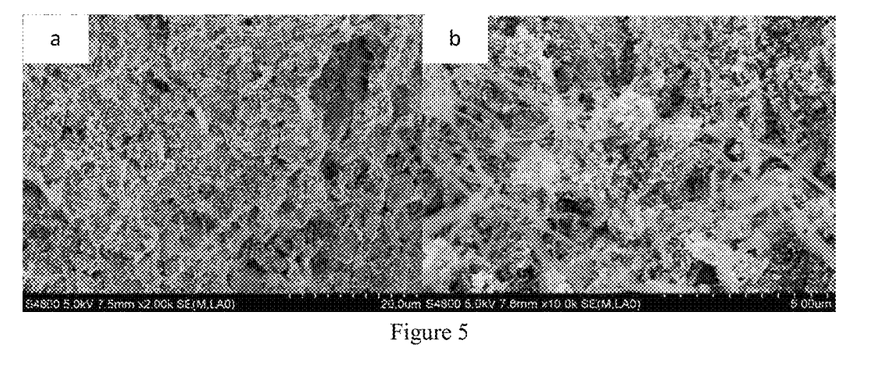
FIG. 5a. SEM image of the surface and cross section of a lead-tungsten proton capacitor negative electrode plate.
FIG. 5b. SEM image of a cross section of a lead-tungsten proton capacitor negative electrode plate.

In order to observe the interfacial adhesion between the active material and the polymer binder, we used a scanning electron microscope to observe the surface and cross section of the plate. See FIG. 5. It can be clearly seen that the surface of the entire active material and the cross-section are distributed with fiber network. This flexible network structure has high viscoelasticity and is favorable for the active material and the conductive agent to contact and form a good interface. The structure of material does not change when used, thereby providing a stable conductive network and improvement on the cycle life.

Figure 6:
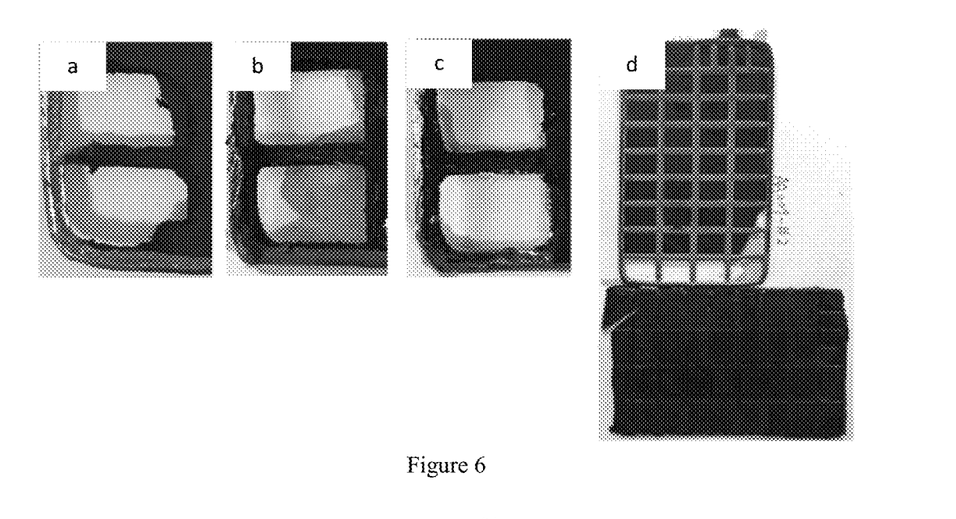
Figure 7:
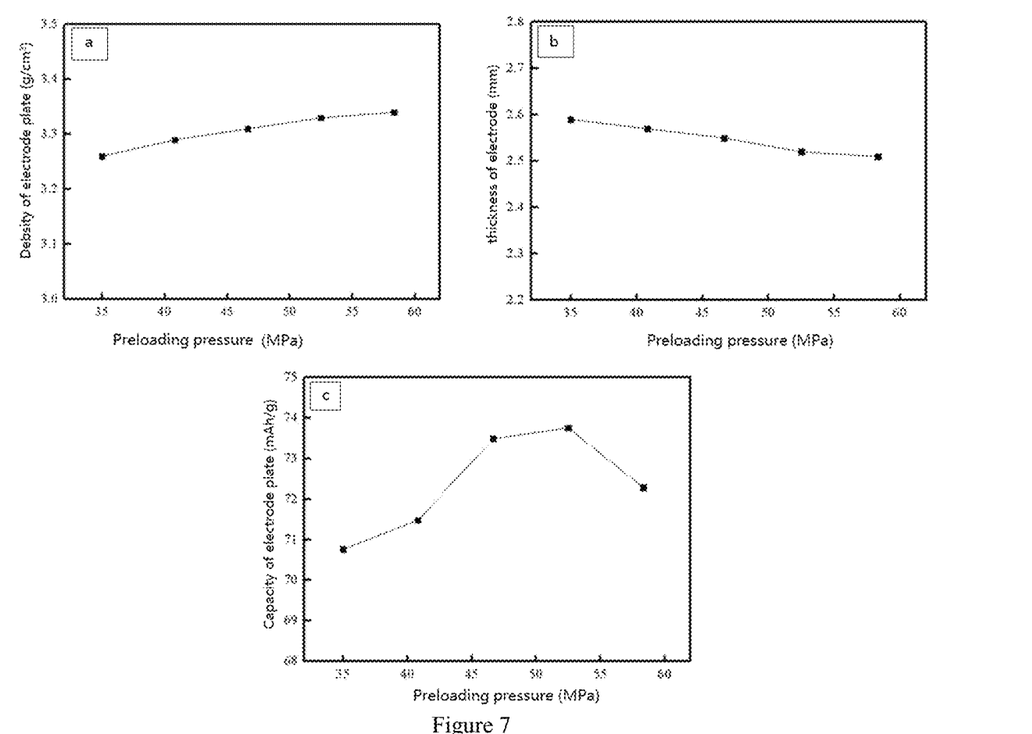
FIG. 7a. The effect of the membrane of Formula 1 under different pre-pressure conditions on the density of the plates.
FIG. 7b. The effect of the membrane of Formula 1 under different pre-pressure conditions on the thickness of the plate.
FIG. 7c. The effect of the membrane of Formula 1 under different pre-pressure conditions on the gram capacity of the plates.

Besides the interface between the active material and the polymer binder, the interface between the entire negative electrode membrane and the grid is equally important. FIGS. 6a, 6b and 6c are the photographs of the adhesion between the grid and the membrane under the three Formulas. It can be seen that the membrane is tightly adhered to the surface of the grid, which greatly enhances the conductivity of the active material, improves the rate capability of the entire plate, and increases the charge and discharge acceptance and cycle life of the lead-tungsten proton capacitor. Therefore, to achieve bonding is an important parameter in the whole process. The polymer involved in the present invention must be involved in a high temperature heating process, in which the heating process is characterized in that the temperature must exceed the glass transition temperature of the polymer to achieve a viscoelastic state. In this heating process, the polymer was pressed inside to form a flexible three-dimensional viscous organic fiber network and the active material becomes a viscous viscoelastic body that tightly adheres to the current collector. As a result, the electrical conductivity and mechanical strength of the plate is greatly improved. If the membrane is pressed at room temperature, there would be no adhesion between the grid and the interface. As a result, the membrane would be completely detached from the grid and would not have enough strength (see FIG. 6d). In order to increase the rate of thermal conductivity of the membrane, a pre-pressing pressure step must be introduced before the final pressing process. This step was introduced because it was easier to embed the grid at the early stage when the membrane was relatively soft, and it is easier to squeeze out most of the air that negatively affects heat transmission. The process mentioned above could greatly increase the density and conductivity of the plates, and further increase the battery capacity, as shown in FIG. 7. Therefore, in the battery plate preparation process, the pre-pressing pressure was from 40 to 50 MPa per unit area of the membrane, the temperature of the plate was from 140 to 320° C., and the final pressing pressure was from 90 to 100 MPa per unit area of the membrane. All of these values are preferred values.

Figure 8:
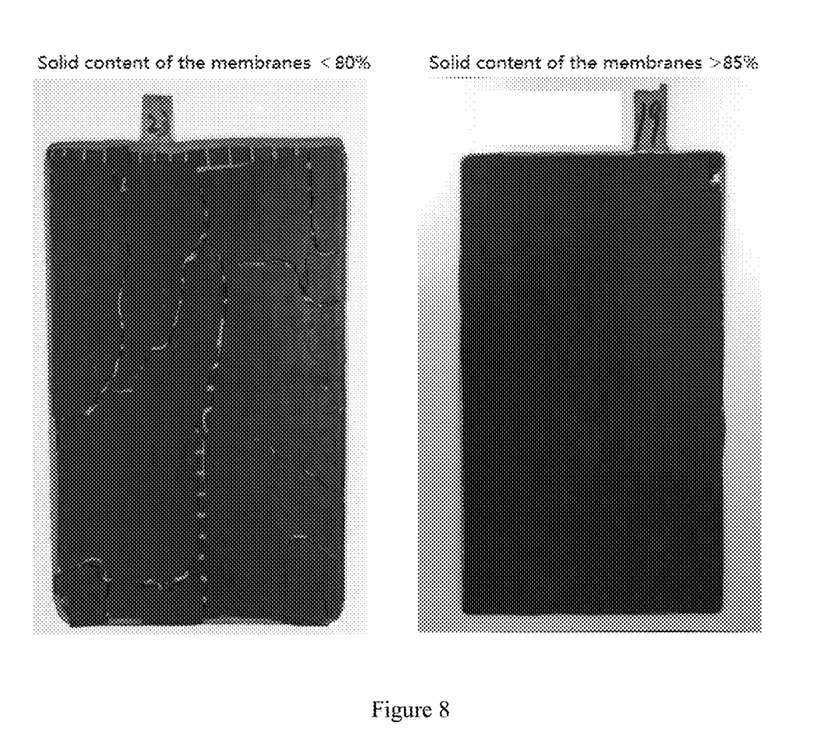
FIG. 8. Photographs of the surfaces of the plates with different solid content of the membranes under the same press conditions.

In addition, the solid content of the negative electrode membrane before the pressing process is also one of the important parameters. It determines the severity of the crack on the surface of an electrode plate prepared under high temperature and high pressure. FIG. 8 shows the membrane surface with different solid content under the same pressure condition. It can be seen that, if the solid content is low, the water accumulated in the membrane will evaporate quickly at high temperature. The additional pressure caused by the capillary condensation increases the stress of the membrane, which intensifies the cracks on the surface of the electrode plate. These cracks will cause corrosion of the grid, the loss of active substances and other negative effects. Considering that the milling process would cause a loss of the water in the paste, the optimized range of solid content of the membrane is from 85% to 95%.

3) Testing and Verifying of Electrochemical Performance

Figure 9:
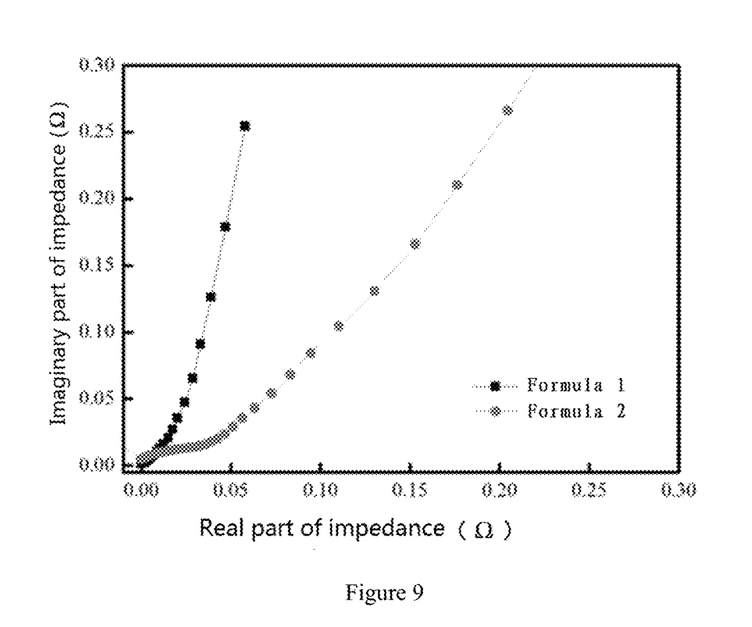
FIG. 9. The alternating current impedance of the membranes with different Formulas under the same press conditions.
Figure 10:
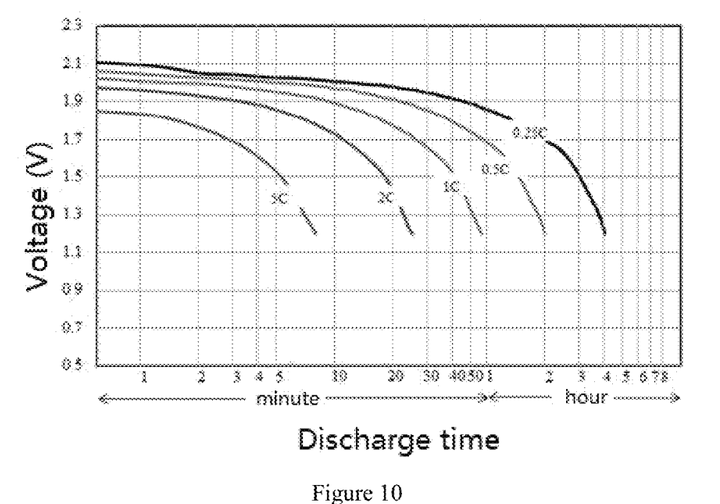
FIG. 10. The performance of a battery assembled with a plate of Formula 2 at different discharge rates.

FIG. 9 shows the comparison of AC impedance of Formula 1 and Formula 2 under the same plate forming conditions. The effect of using a single glue and a mixture of glue components on the charge transfer resistance and diffusion internal resistance of the battery electrode plate can be seen from FIG. 9. Firstly, both charge transfer resistance and diffusion internal resistance of Formula 1 (5% PTFE only) were less than that of Formula 2 (5% of PTFE+2% EFP mixture). But the mechanical strength of plate formed according to Formula 2 is better than plate formed according to Formula 1. The reasons of this better mechanical strength are that: 1) an increase in the amount of adhesive content, and 2) the effect of different polymers in the plates is different. The fiber network structure of the whole plate is mainly contributed by PTFE, but the highly symmetrical structure of the PTFE leads to a higher melting point. Once the EFP with lower molecular chain or PVDF with asymmetric structure is introduced, the high temperature in the whole plate preparation process can be reduced to expand the entire process window and indeed form a complete, viscous, three-dimensional fiber network structure. FIG. 10 shows the performance curves of batteries assembled with the plates of Formula 2 at different discharge rates, combined with the data in Table 2, shows that although the internal resistance of the said polymer alone is relatively small, using of polymer mixed with other types of polymer further enhances the structural strength of the electrode plate and still exhibits excellent rate performance. Compared with traditional lead-acid battery, the capacity retention of batteries assembled by plates of Formulas 1-3 is almost 2 to 3 times of that of lead-acid battery.

TABLE 2

Capacity retention of batteries assembled with plates of different Formulas at different discharge rates

| Lead tungsten proton capacitor | Different hour rate of discharge | | | | 4 hr rate | 2 hr rate | 1 hr rate | 0.5 hr rate | 0.2 hr rate |
| --- | --- | --- | --- | --- | --- | --- | --- | --- | --- |
| Capacity retention | | Formula 1 | | | 100% | 98.8% | 92.4% | 80.6% | 62.4% |
| | | Formula 2 | | | 100% | 96.9% | 90.2% | 79.5% | 56.7% |
| | | Formula 3 | | | 100% | 97.9% | 90.7% | 80.1% | 60.8% |
| Lead-acid battery | 10 hr rate | 8 hr rate | 6 hr rate | 5 hr rate | 3 hr rate | 2 hr rate | 1 hr rate | 0.5 hr rate | 0.25 hr rate |
| Capacity retention | 100% | 94% | 89% | 85% | 75% | 60% | 55% | 40% | 35% |

In order to further show the influence of this plate preparation process on the cycle life of the battery, we assembled the plates of Formula 2 into four groups of 2V 5Ah batteries, poured 135 ml of 1.18 g/cm3 sulfuric acid electrolyte. The cycle stability through different charge and discharge currents was tested and shown in FIG. 11.

Figure 11:
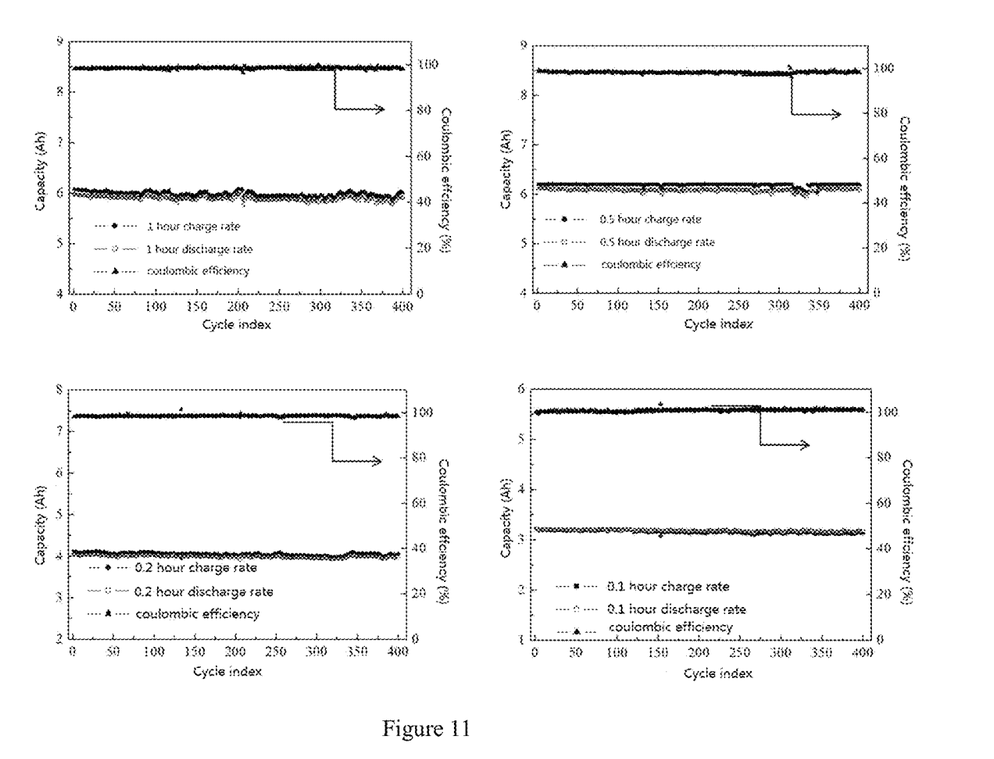
FIG. 11. The cycle life of lead-tungsten proton capacitors of Formula 1 under 1 hour discharge rate, 0.5 h discharge rate, 0.2 h discharge rate and 0.1 h discharge rate.

It can be seen from the FIG. 11 that the four groups of batteries are subjected to a fully charged and discharged cycle at a charge and discharge rate of 1 h, 0.5 h, 0.2 h and 0.1 h, respectively. It can be seen that, the capacity retention rate of the four groups of batteries above is still 100% after 400 cycles, while the capacity retention of the traditional lead-acid battery is reduced from 100% to 80% at charge and discharge rates of 5 h or lower with 300 fully charge and discharge cycles. These results further show that changes in the plate preparation process play a very important role in improving overall battery performance.

It should be pointed out that, while the present invention has exemplary embodiments disclosed herein, the exemplary embodiments or their implementations are not intended to limit this present invention in any way. Any person of ordinary skill in the art can use the disclosure herein to make equivalent changes and modifications towards other valid embodiments. As long as the scope of the present invention is not exceeded, any embodiments made by changing or modifying the above embodiments shall be within the scope of this invention.

The invention claimed is:

1. A method of preparing a battery electrode plate, comprising the following steps:
   a) a mixing step comprising of mixing an electrode active materials and a conductive agent with a prescribed polymer, and stirring evenly the electrode active materials, the conductive agent, and the polymer into a paste;
   b) milling and polishing the paste formed in the step a) to fibrillate the polymer in the paste;
   c) extruding, shearing and extending the paste obtained in the step b) to turn it into an uniformly compact active membrane that has controllable thickness;
   d) cutting the active membrane obtained in the step c) into the desired size according to an electroplate design to obtain different size pieces of electrode membranes; and
   e) inserting a current collector between two pieces of electrode membrane, and then pressing the two pieces of electrode membranes and the current collector into a plate under high temperature and high pressure.

2. The method according to claim 1, wherein said polymer is selected from one or more of polytetrafluoroethylene (PTFE), polyvinylidene difluoride (PVDF), fluorinated ethylene propylene (FEP), fluororubber, trifluoro(heptafluoro-1-propoxy) ethylene and Polyfluoroalkoxy (PFA).

3. The method according to claim 2, wherein said polymer is in the form of an emulsion, and has a solid content of from 50% to 60%, a melt index of from 3 to 10, a melting point of from 120° C. to 320° C., and a polymer particle size of from 5 μm to 100 μm.

4. The method according to claim 2, wherein the particle size of said polymer is from 5 μm to 50 μm.

5. The method according to claim 1, wherein the content of said polymer in the battery electrode plate is from 1 wt % to 20 wt %.

6. The method according to claim 5, wherein the content of said polymer in the battery electrode plate is from 3 wt % to 10 wt %.

7. The method according to claim 1, wherein said electrode active materials is selected from any of the positive or negative materials suitable for lead acid battery, lead acid super battery, lead tungsten proton capacitor, graphene battery, lithium ion battery, supercapacitor, and/or NiMH battery.

8. The method according to claim 1, wherein said electrode active materials comprises lead oxide, lead, lithium cobaltate, lithium manganate, ternary or multi-element oxide, lithium iron phosphate, lithium titanate, graphite, graphene, activated carbon, carbon black, nickel oxide, nickel hydroxide, metal hydrogen storage alloy, tungsten oxide, molybdenum oxide, vanadium oxide and/or manganese oxide.

9. The method according to claim 1, wherein said mixing process includes the steps of: adding the prescribed amount of electrode active materials into a mixer; dry mixing the electrode active materials at a dispersion speed of from 300 rpm to 1000 rpm and a revolution speed of from 20 rpm to 200 rpm; spraying said polymer to the mixed content in the mixer, wherein said polymer is from 3 wt % to 20 wt % of the paste; stirring the polymer and the electrode active materials for from 10 minutes to 30 minutes; and extruding the paste, wherein the solid content of the paste is from 60 wt % to 85 wt %.

10. The method according to claim 9, wherein said dispersion speed is from 300 rpm to 600 rpm, said revolution speed is from 20 rpm to 60 rpm, and said polymer is from 3 wt % to 10 wt % of the paste.

11. The method according to claim 1, wherein the number of times of the milling and polishing in step b) is less than 10, and the speed is from 1 m/s to 18 m/s.

12. The method according to claim 11, wherein said number of times of the milling and polishing in step b) is less than 8, and the speed is from 1 m/s to 10 m/s.

13. The method according to claim 1, wherein the thickness of said active material membrane in step c) is from 1 mm to 5 mm, and the solid content of the membrane is from 70% to 90%.

14. The method according to claim 13, wherein the thickness of said active material membrane is from 1 mm to 3 mm.

15. The method according to claim 1, wherein said battery electrode plate preparation method further comprises drying the cut electrode membrane obtained in step d), wherein the solid content of the dried electrode membrane is from about 80% to about 95% and the drying temperature is from 50° C. to 200° C.

16. The method according to claim 15, wherein said drying temperature is from 50° C. to 100° C.

17. The method according to claim 1, wherein said current collector in step e) is a conductive materials.

18. The method according to claim 17, wherein said current collector is selected from one or more lead grid, titanium mesh, copper mesh, aluminum mesh, stainless steel mesh, carbon felt and/or carbon cloth.

19. The method according to claim 1, wherein the step e) specifically comprises: pre-pressing the two pieces of electrode membrane and the current collector with a press machine, wherein the pre-pressing pressure is from 30 MPa to 60 MPa per unit area of membrane, and the pre-pressing dwell time is from 5 s to 180 s; heating the pre-pressed plate in a tunnel kiln for heating; and heating the pre-pressed plate to a temperature of from 140° C. to 320° C., and pressing the heated pre-pressed plate using a pressing pressure of from 70 MPa to 120 MPa per unit area of the membrane and a dwell time of from 10 s to 600 s to form the plate.

20. The method according to claim 19, wherein said pre-pressing pressure is from 30 MPa to 60 MPa per unit area of membrane, the heating temperature of the pre-pressed plate is from 140° C. to 320° C., and the final pressing pressure is 90 MPa to 100 MPa per unit area of the membrane.

21. An energy storage battery comprising an electrolyte and an electrode comprising of the battery electrode plate prepared by the method according to claim 1.

22. The energy storage battery according to claim 21, wherein the energy storage battery is a battery selected from a list comprising of a lead-acid battery, a super battery based on a lead-acid system, a lithium-ion battery, a supercapacitor, and a Ni-MH battery.

23. The energy storage battery according to claim 22, wherein the electrolyte is selected from one or more of sulfuric acid, potassium hydroxide, sodium sulfate solution, and lithium ion battery organic electrolyte and/or ionic liquid.

* * * * *